United States Patent
Narita et al.

[11] Patent Number: 6,011,556
[45] Date of Patent: Jan. 4, 2000

[54] AUTOMATIC APPARATUS FOR DRAWING IMAGE OF THREE-DIMENSIONAL OBJECT ON A SCREEN

[75] Inventors: Masahiko Narita; Akiyoshi Katsumata; Makiko Shimamura; Takanori Tateno, all of Kawasaki, Japan

[73] Assignee: Fujitsu Limited, Kanagawa, Japan

[21] Appl. No.: 08/702,204

[22] Filed: Aug. 23, 1996

Related U.S. Application Data

[63] Continuation of application No. 08/035,508, Mar. 22, 1993, abandoned, which is a continuation of application No. 08/859,077, Mar. 27, 1992, abandoned.

[30] Foreign Application Priority Data

Mar. 29, 1991 [JP] Japan .................................. 3-065192

[51] Int. Cl.$^7$ .................................................. G06T 15/50
[52] U.S. Cl. .................................................. 345/419
[58] Field of Search .................................. 395/119, 121, 395/123, 125, 126, 131; 364/413.15, 413.18; 382/199, 302; 345/419, 421, 423, 425, 426, 431

[56] References Cited

U.S. PATENT DOCUMENTS

| | | | |
|---|---|---|---|
| T912,012 | 7/1973 | Appel et al. | 345/426 |
| 3,602,702 | 8/1971 | Warnock | 345/421 |
| 4,685,070 | 8/1987 | Flinchbaugh | 345/424 |
| 4,700,181 | 10/1987 | Maine et al. | 345/508 |
| 4,847,789 | 7/1989 | Kelly et al. | 345/421 |
| 4,862,392 | 8/1989 | Steiner | 345/427 |
| 4,882,683 | 11/1989 | Rupp et al. | 345/516 |
| 4,888,713 | 12/1989 | Falk | 345/425 |
| 4,912,659 | 3/1990 | Liang | 345/434 |
| 4,967,375 | 10/1990 | Pelham et al. | 345/515 |
| 4,989,142 | 1/1991 | Crawford | 382/131 |
| 5,003,498 | 3/1991 | Ota et al. | 345/420 |
| 5,055,918 | 10/1991 | Berman | 348/578 |
| 5,163,126 | 11/1992 | Einkauf et al. | 345/423 |
| 5,265,198 | 11/1993 | Gonzales-Lopez et al. | 345/422 |
| 5,369,736 | 11/1994 | Kato et al. | 345/425 |
| 5,457,755 | 10/1995 | Ishida et al. | 382/324 |

FOREIGN PATENT DOCUMENTS

0329476  8/1989  European Pat. Off. .

*Primary Examiner*—Anton Fetting
*Attorney, Agent, or Firm*—Helfgott & Karas, P.C.

[57] ABSTRACT

A high-speed automatic image drawing apparatus divides a three-dimensional object to draw into primitives that can be drawn at a high speed, and draws an image of the object according to the primitives by gradually changing lightness and chromaticity. The image thus provided has a material-like impression. The apparatus comprises a primitive forming unit for dividing the three-dimensional object to draw into predetermined shapes and forming primitives according to the shapes, and a grading unit for drawing the object according to the primitives by gradually changing lightness and chromaticity. In response to a request of drawing a three-dimensional object, the primitive forming unit divides the object into predetermined shapes, and forms primitives for the shapes. Thereafter, the grading unit draws an image of the object according to the primitives by gradually changing lightness and chromaticity.

14 Claims, 11 Drawing Sheets

DRAWING REQUESTS FOR DIVIDED PRIMITIVES — S11

PRIMITIVE ELLIPSE

S12 —
| ELLIPSE | MAJOR AXIS | MINOR AXIS | COLOR | OTHERS |

S13 — DRAW THE CENTER AND PERIPHERY WITH A DARK COLOR AND THE MIDDLE WITH A LIGHT COLOR. DIVIDE INTERMEDIATE AREAS INTO SECTIONS, AND COLOR THE SECTIONS BY GRADUALLY CHANGING LIGHTNESS

END

Fig. 3(B)

- S21: DRAWING REQUESTS FOR DIVIDED PRIMITIVES
- PRIMITIVE RECTANGLE
- S22: RECTANGLE | WIDTH | HEIGHT | COLOR | OTHERS
- S23: DRAW THE CENTER AND SIDES WITH A DARK COLOR AND THE MIDDLES WITH A LIGHT COLOR. DIVIDE INTERMEDIATE AREAS INTO SECTIONS, AND COLOR THE SECTIONS BY GRADUALLY CHANGING LIGHTNESS
- END

DRAWING REQUESTS FOR DIVIDED PRIMITIVES —S41

PRIMITIVE RIGHT TRIANGLE

| RIGHT TRIANGLE | BASE | HEIGHT | COLOR | OTHERS |

S42

S43 — DRAW THE LEFT AND RIGHT ENDS OF THE BASE WITH A DARK COLOR AND THE MIDDLES WITH A LIGHT COLOR, DIVIDES THE BASE INTO SEGMENTS, AND COLOR SMALL TRIANGLES DEFINED BY THE SEGMENTS AND A VERTEX BY GRADUALLY CHANGING LIGHTNESS

END

Fig. 5(A)

CYLINDER A

Fig. 5(B)

ELLIPSE A1

RECTANGLE A2

AUTOMATIC APPARATUS FOR DRAWING IMAGE OF THREE-DIMENSIONAL OBJECT ON A SCREEN

CROSS-REFERENCE TO RELATED APPLICATIONS

This application is a continuation of application Ser. No. 08/035,508 filed Mar. 22, 1993 and now abandoned and which is in turn a continuation of application Ser. No. 08/859,077 filed Mar. 27, 1992 and also abandoned.

BACKGROUND OF THE INVENTION

1. Field of the Invention

The present invention relates to an image drawing apparatus for drawing a three-dimensional image on a screen at a high speed.

2. Description of the Related Art

One conventional drawing technique computes every dot (pixel) of a three-dimensional object and draws an image of the object on a screen. This technique handles an enormous amount of three-dimensional data to draw the image dot by dot and provide the image with stereoscopic and texture effects on the screen.

Another conventional drawing technique that is relatively fast relies on (1) using variables for describing colors and simple shapes involving color values, widths, heights, etc., and (2) drawing simple shapes such as ellipses, rectangles, and triangles of specified sizes and shapes, (3) a specified color.

Here, providing an image with a texture effect means to draw and color the image in a way so as to provide the image with a metal-like, wood-like, or cloth-like feel.

The former conventional technique is not proper for high-speed drawing because it computes every dot of an image. The latter conventional technique is capable of drawing only a simple figure with a single color, so that it is not suitable for drawing a three-dimensional image having a metallic touch and smooth curves.

SUMMARY OF THE INVENTION

An object of the invention is to provide a high-speed automatic image drawing apparatus that divides a three-dimensional image into primitives that can be drawn at a high speed, and plots the primitives by changing lightness and chromaticity; thereby providing each part of the image with a material-like impression.

In order to accomplish the object, an automatic image drawing apparatus for drawing a three-dimensional object according to the invention comprises a primitive forming means for dividing the three-dimensional object into unit shapes and preparing primitives for the shapes, a grading means for dividing each of the primitives into sections and coloring the sections by changing lightness and chromaticity according to predetermined conditions, a displaying means for combining the graded primitives into an image of the three-dimensional object and displaying the image.

The drawing apparatus according to the present invention incorporates the primitive forming means for dividing a three-dimensional object into predetermined shapes and forming primitives for the shapes. The apparatus of this invention also incorporates the grading means for drawing the shapes according to the primitives by gradually changing lightness and chromaticity.

Upon receiving a request to draw a three-dimensional object, the primitive forming means divides the object into predetermined shapes and forms primitives for the shapes. The grading means then draws the shapes according to the primitives by gradually changing lightness and chromaticity.

In this way, the invention divides a three-dimensional object into simple shapes such as circles, ellipses, rectangles, and triangles, forms primitives for the shapes, and draws the shapes according to the primitives by gradually changing lightness and chromaticity; thereby completing a three-dimensional image of the object having a material-like effect at a high speed.

DESCRIPTION OF THE PREFERRED EMBODIMENTS

Preferred embodiments of the invention will be explained with reference to the drawings.

Figure 1:
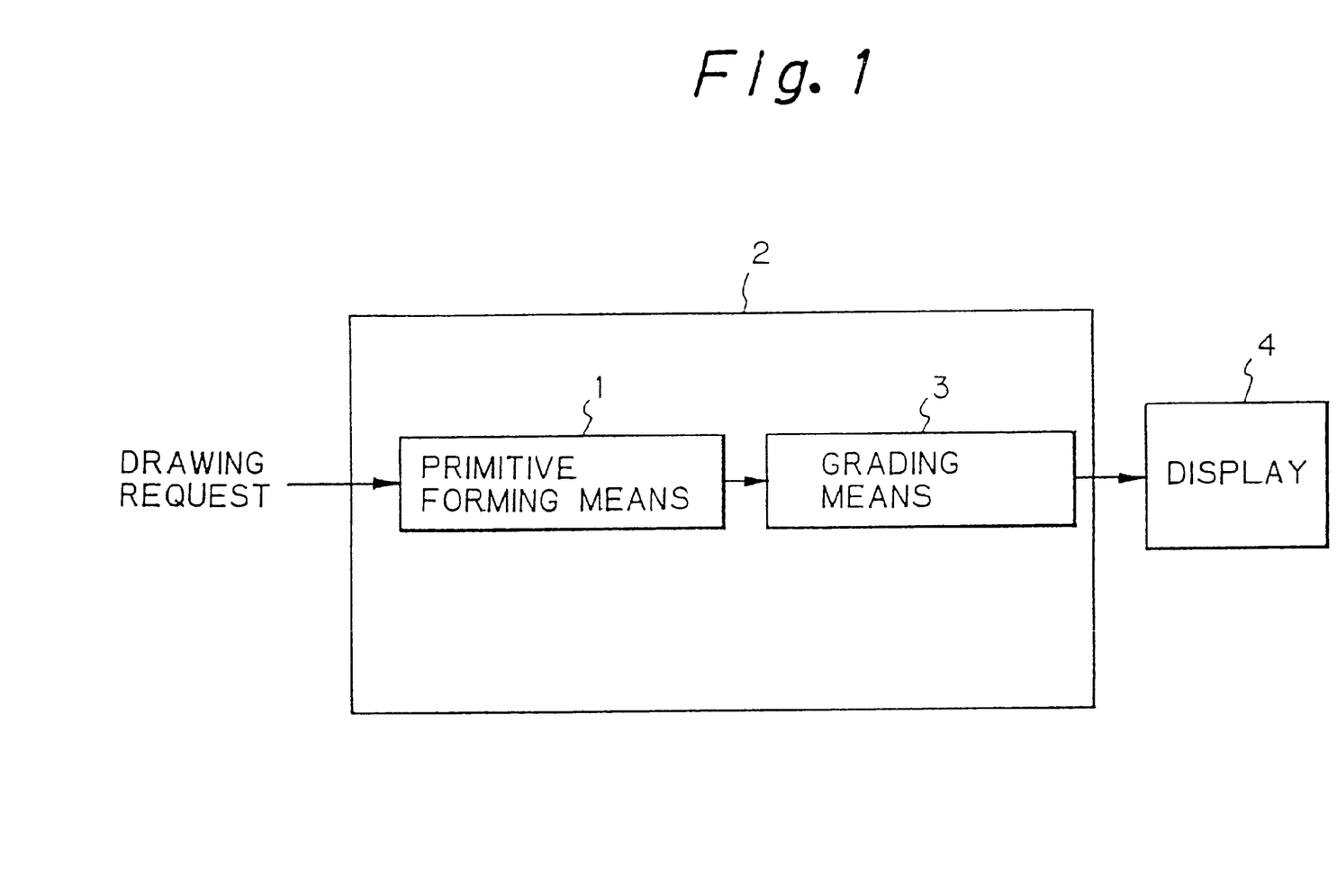
FIG. 1 is a schematic view showing a principle of the automatic image drawing apparatus according to the invention.

FIG. 1 shows a principle of the invention. In the figure, a drawing apparatus 2 includes a primitive forming means or unit 1 which receives a request to draw a three-dimensional object, divides the object into shapes such as rectangles, triangles, circles, ellipses, disks, and polygons that can be drawn at a high speed, and forms primitives for the shapes. For example, a primitive for an ellipse involves data representing an ellipse, a major axis, a minor axis, colors, etc. Namely, according to the invention, the primitive is a simplest unit shape used for computer image processing.

According to the primitives prepared by the primitive forming means or unit 1 for the shapes such as circles, ellipses, rectangles, and triangles that can be drawn at a high speed, a drawing apparatus 2 draws the said shapes at a high speed. The apparatus 2 also includes a grading means or unit 3.

The grading means 3 sequentially draws three-dimensional shapes having a material-like feel according to the primitives provided by the primitive forming means 1 by gradually changing lightness and chromaticity.

A display 4 combines the shapes drawn by the grading means 3 together and displays an image of the three-dimensional object.

The grading means 3 selects the lightest first part and the darkest second part on one of the selected primitives, divides an intermediate area between the first and second parts into a plurality of sections, and colors and draws the sections in descending order of lightness from the section corresponding to the first part toward the section corresponding to the second part.

According to the invention, the grading means 3 may select the lightest and darkest parts on a selected primitive; divide an intermediate area between the lightest and darkest parts into a plurality of sections; color the section corresponding to the lightest part with a lightest color, and color the remaining sections by successively reducing the lightness of the color at a predetermined rate toward the section corresponding to the darkest part.

Alternatively, the grading means 3 may select the lightest or darkest part on a selected primitive and the darkest or lightest parts on opposite sides of the lightest or darkest part, and color intermediate areas between the lightest and darkest parts by successively changing the lightness at a predetermined rate.

Also, the grading means 3 may alternately arrange a plurality of lightest and darkest parts on a selected primitive.

In the embodiment, sections of each primitive are colored by successively reducing lightness from the lightest section toward the darkest section. This does not limit the invention. For example, each primitive may be colored by irregularly changing the lightness.

The grading means 3 may paint each primitive with a single color, two colors, or more than two colors. When a plurality of colors are used, the grading means 3 selects the lightest first part and the darkest second part for each color on a selected primitive; divides an intermediate area between the first and second parts into a plurality of sections, and colors the sections in descending order of lightness from the section corresponding to the first part the section corresponding to the second part.

Figure 2:
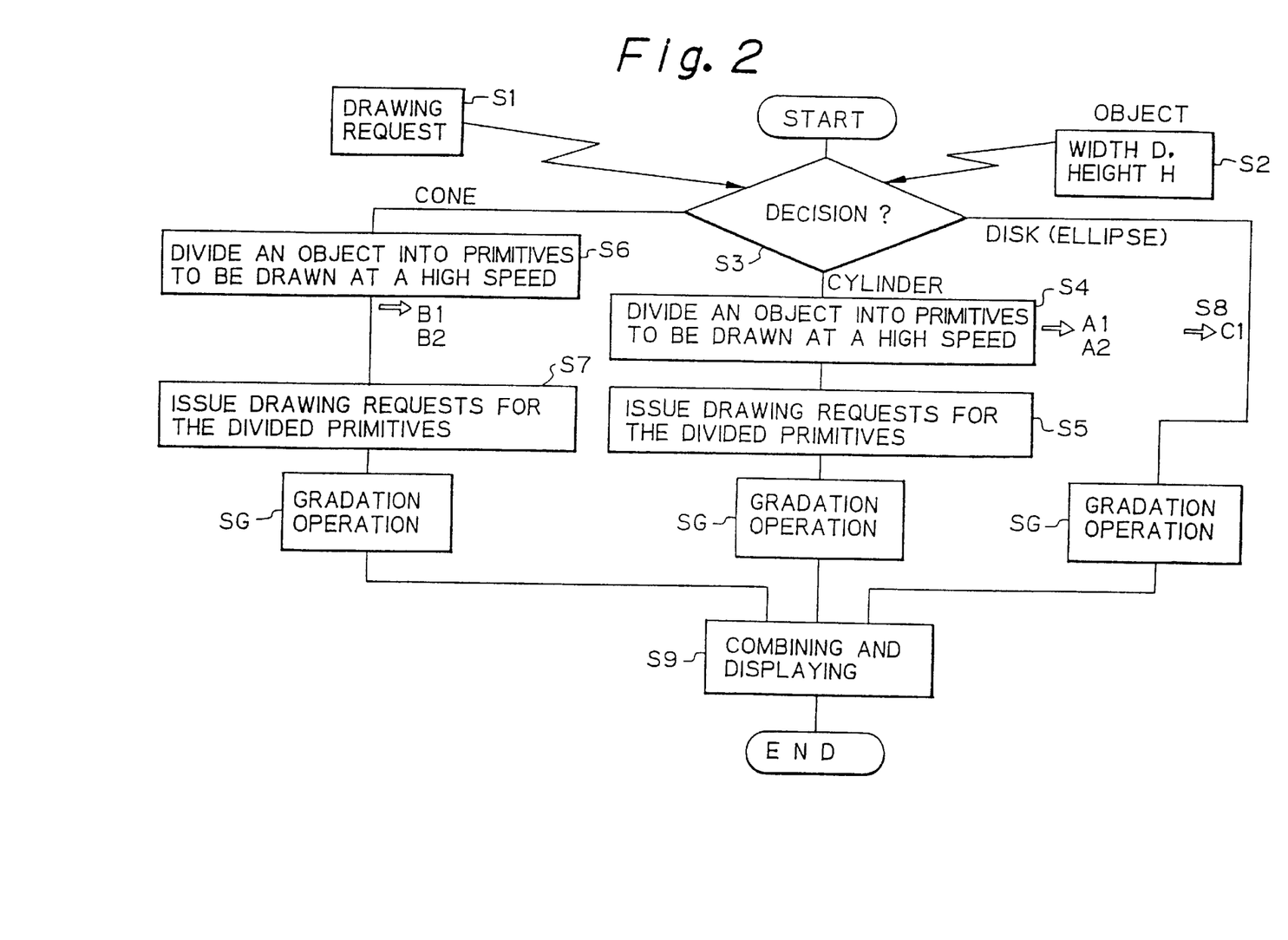
FIG. 2 is a flowchart showing a process of forming primitives by the apparatus according to the invention.

FIG. 2 is a flowchart showing a primitive forming process.

Figure 5A:
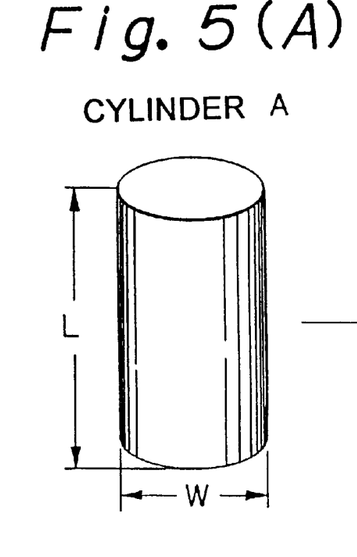
FIGS. 5A through 5E show the steps of the process of a drawing cylinder by the apparatus according to the invention.

Step S1 provides a request of drawing a three-dimensional object, e.g., a cylinder shown in FIG. 5A.

Step S3 determines the shape of the three-dimensional object, e.g., a cylinder, cone, disk, or sphere. Step S2 is a request to draw a cylinder.

Figure 5B:
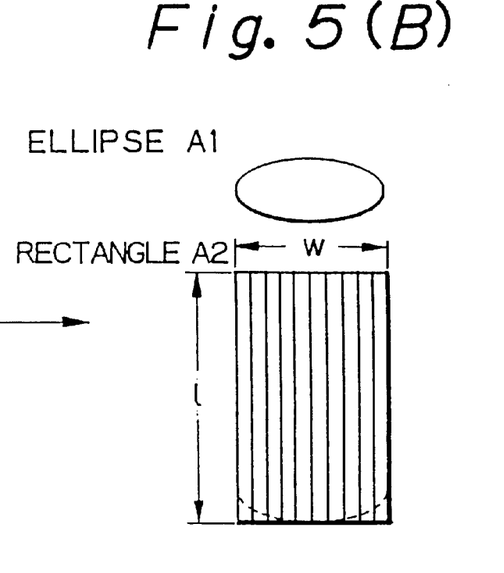

If the object is a cylinder, Step S4 divides the object into primitives that can be drawn at a high speed. Namely, the cylinder is divided into an ellipse A1 and a rectangle A2 as shown in FIG. 5B.

Step S5 issues requests to draw the divided primitives. Namely, for the ellipse A1, Step S5 provides primitive data ELLIPSE indicating an ellipse, a major axis, a minor axis, colors, and others, and for the rectangle A2, primitive data RECTANGLE indicating a rectangle, a width, a height, colors, and others.

Figure 5C:
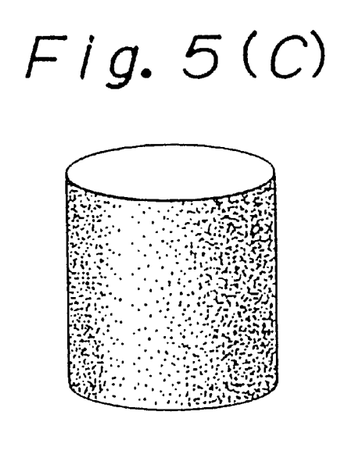

In this embodiment, the cylinder of FIG. 5(A) is colored and drawn into a cylindrical image having metallic stripes shown in FIG. 5(C). For this purpose, the object is divided into the elliptic primitive A1 and rectangular primitive A2.

Since no process is needed for the ellipse A1, the data ELLIPSE involving the major axis, minor axis, colors, and others are stored in a memory.

Figure 5D:
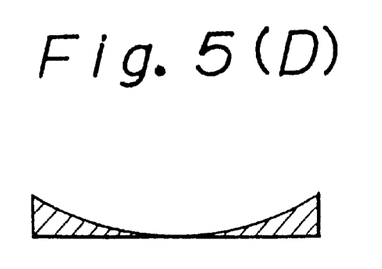

The rectangular primitive A2 is shaped into a rectangle having a long side l equal to the height L of the cylinder of FIG. 5(A) and a width w equal to the width W of the cylinder. In a later stage, this rectangle is trimmed using a clip mask having a predetermined arc as shown in FIG. 5(D) to form a lower arc portion of the cylinder.

The request to draw the rectangular primitive provided by Step S5 includes information about a color or a combination of colors, information about at least one of each of the lightest and darkest parts for each color; information about the number of sections to be formed between the lightest and darkest parts, and information about the regular or irregular widths of the sections. According to these pieces of information, Step SG carries out predetermined operations.

Figure 5E:
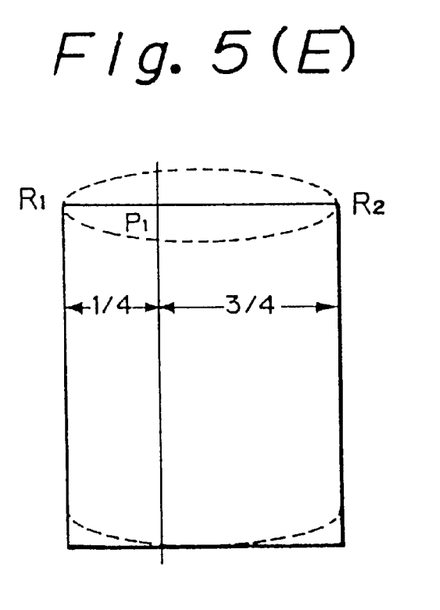

As shown in FIG. 5(E), this embodiment uses two colors, i.e., white and black, and sets a lightest part P at about one fourth of the width of a short side of the rectangle from the left side thereof, and the darkest parts at edges R1 and R2. Intermediate areas between the lightest part P and the edge parts R1 and R2 are each divided into 16 sections whose widths become narrower from the part P toward the parts R1 and R2.

Figure 8:
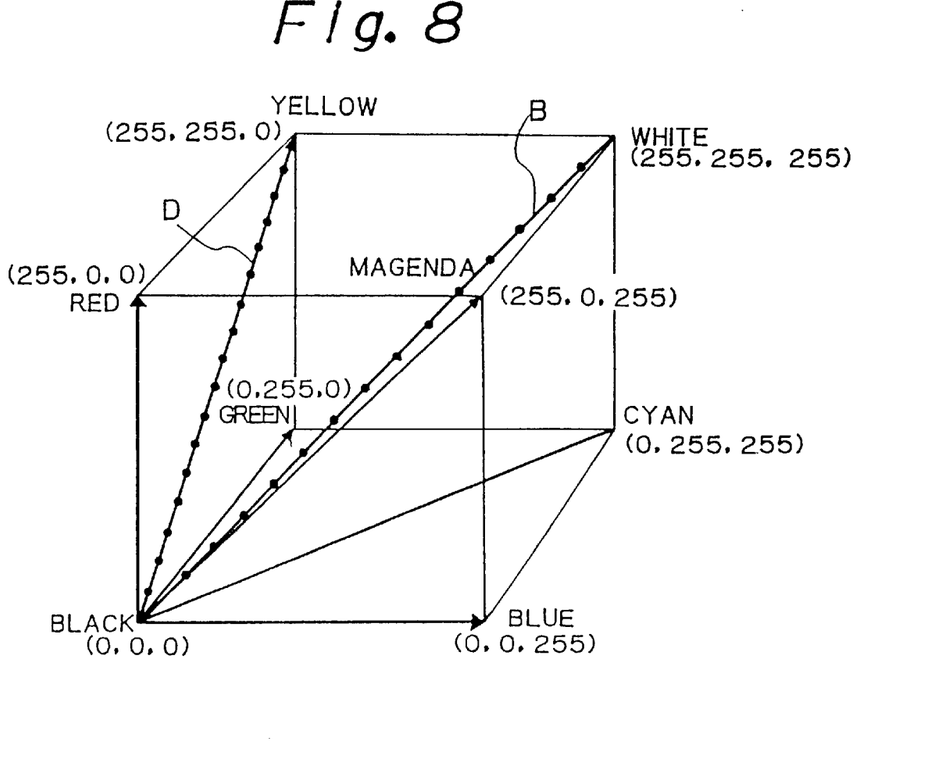
FIG. 8 is a view showing color vectors produced by the apparatus according to the invention.
Figure 9:
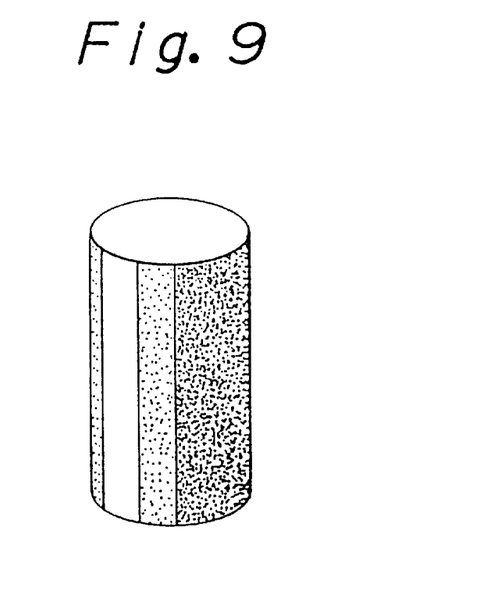
FIG. 9 is a view showing a primitive divided into sections produced by the apparatus according to the invention.

The section corresponding to the part P is painted with a white color vector (255, 255, 255) on a color vector line B extending from the white color vector (255, 255, 255) to a black color vector (0, 0, 0) on a standard color vector table of grading colors shown in FIG. 8. On the other hand, the sections corresponding to the darkest parts R1 and R2 are colored with the black color vector (0, 0, 0). The remaining intermediate sections are colored with color vectors corresponding to 16 equally dividing points on the color vector line B between the white color vector (255, 255, 255) and the black color vector (0, 0, 0).

Lastly, Step S9 combines the ellipse A1 and rectangle A2 together; trims the lower part of the rectangle A2 with the clip mask, and provides a graphic image of FIG. 5(C).

Figures 6A, 6B:
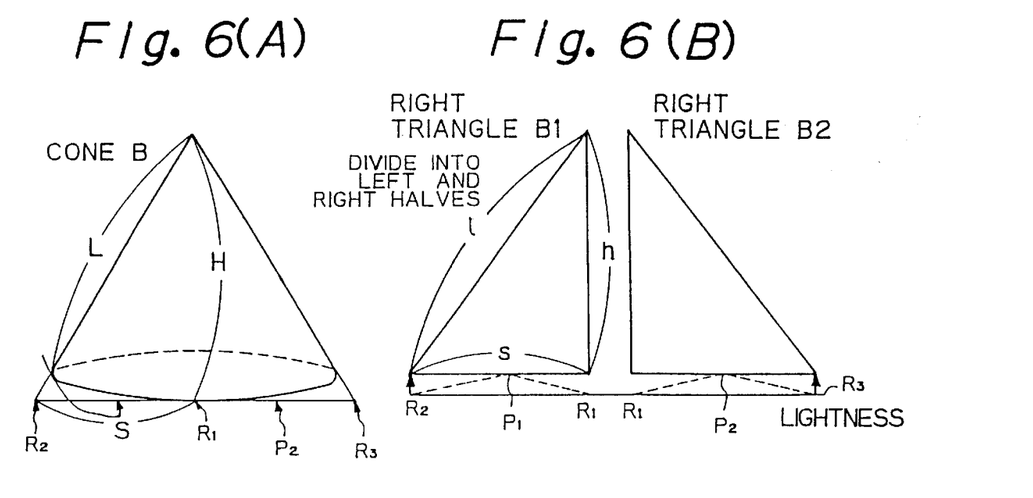
FIGS. 6A through 6D show the steps of the process of drawing a cone by the apparatus according to the invention.

If the object to be drawn is a cone (FIGS. 6A–6D), Step S6 divides the given conical object into primitives that can be drawn at a high speed. In this case, the primitives are right triangles B1 and B2 as shown in FIG. 6(B). Step S7 issues requests to draw the divided primitives.

According to the embodiment, a virtual triangle having a height H, a base S, and an oblique line L is formed at first on the given cone, as shown in FIG. 6(A). From this virtual triangle, the two primitives, i.e., the two right triangles B1 and B2 shown in FIG. 6(B) are formed. Each of the right triangles B1 and B2 has a height h, a base s and an oblique line l, which are the same as the height H, base S, and oblique line L of the virtual triangle.

In a later stage, the two right triangle primitives are trimmed at their bases using clip masks having predetermined arcs to form a lower arc of the cone, to provide an image shown in FIG. 6(D).

In this embodiment, a darkest part R1 is located at the center of the cone and other darkest parts R2 and R3 are located at opposite ends of the cone. A lightest part P1 is located in the middle of the darkest parts R1 and R2, and another lightest part P2 is located in the middle of the darkest parts R1 and R3. The right triangles are colored, for example, black and yellow.

Each of intermediate areas between the part R1 and the parts R2 and R3 is equally divided by eight.

The lightest parts P1 and P2 are colored with a yellow color vector (255, 255, 0), and the darkest parts R1, R2, and R3 with a black color vector (0, 0, 0). The remaining intermediate sections are colored with color vectors corresponding to eight equally dividing points on a color vector line D between the yellow color vector (255, 255, 0) and the black color vector (0, 0, 0).

Figure 6C:
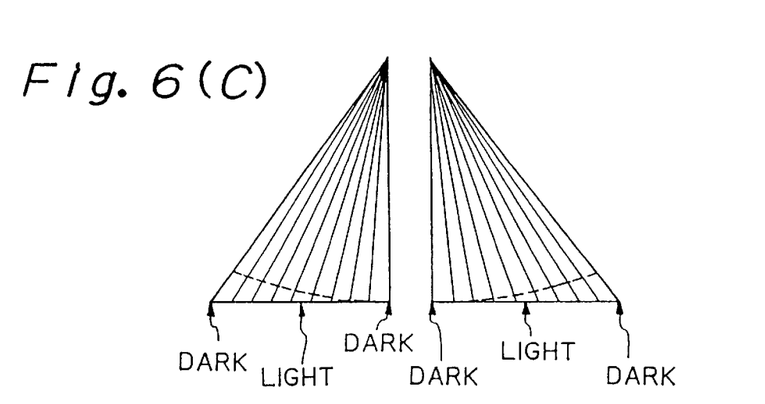
Figure 6D:
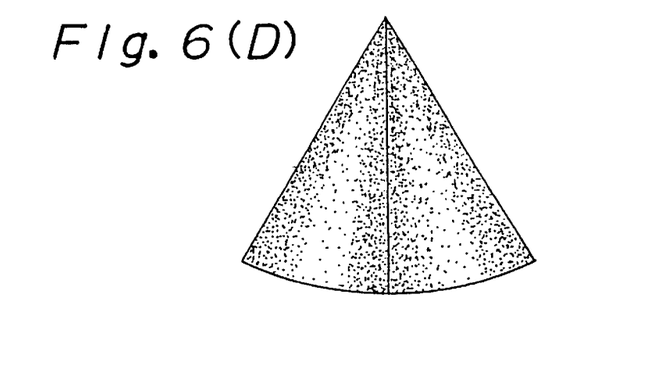

Lastly, Step S9 combines the two right triangles B1 and B2 together; trims the lower ends of the right triangles B1 and B2 with the clip masks, and provides a graphic image shown in FIG. 6(D).

If the object to draw is a disk (FIG. 7A), it is not necessary to divide the object into a plurality of primitives.

Figures 7A, 7B:
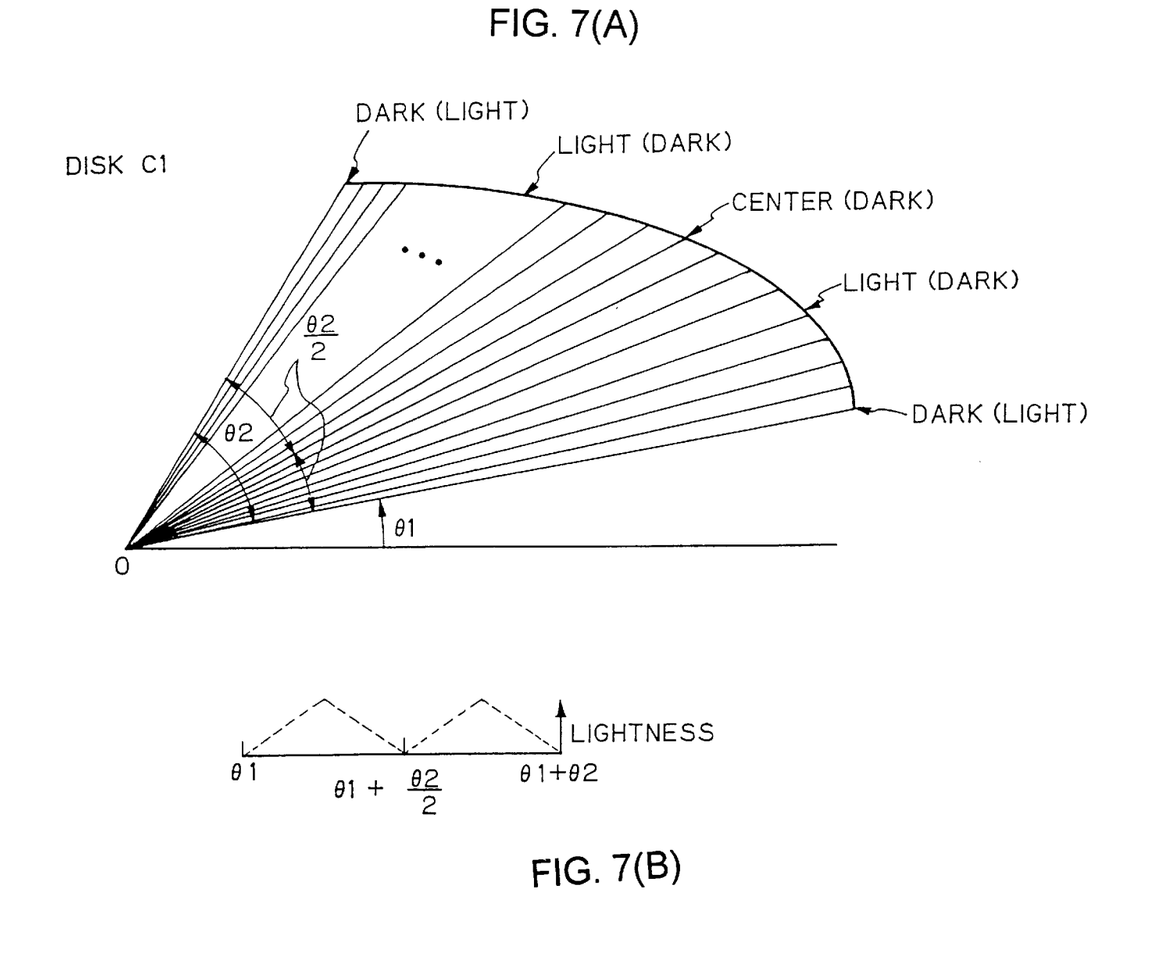
FIG. 7A is a view showing the steps of the process of drawing a disk by the apparatus according to the invention.
FIG. 7B shows a lightness change in the process of FIG. 7A.

Required data are a diameter, a center angle, a color changing direction (a radial direction or a center angle changing direction), a lightest part, a darkest part, etc. According to these data, necessary processes are carried out.

In this way, the invention determines the shape of a three-dimensional object to be a sphere, cylinder, cone, disk, or any other shape, divides the object into shapes such as circles, ellipses, right angles, and disks that can be drawn at a high speed, prepares primitives for the shapes, and issues drawing requests for the primitives. Through these processes, the invention draws an image of the three-dimensional object and provides each section of the image with a material-like impression at a high speed.

Figure 3A:
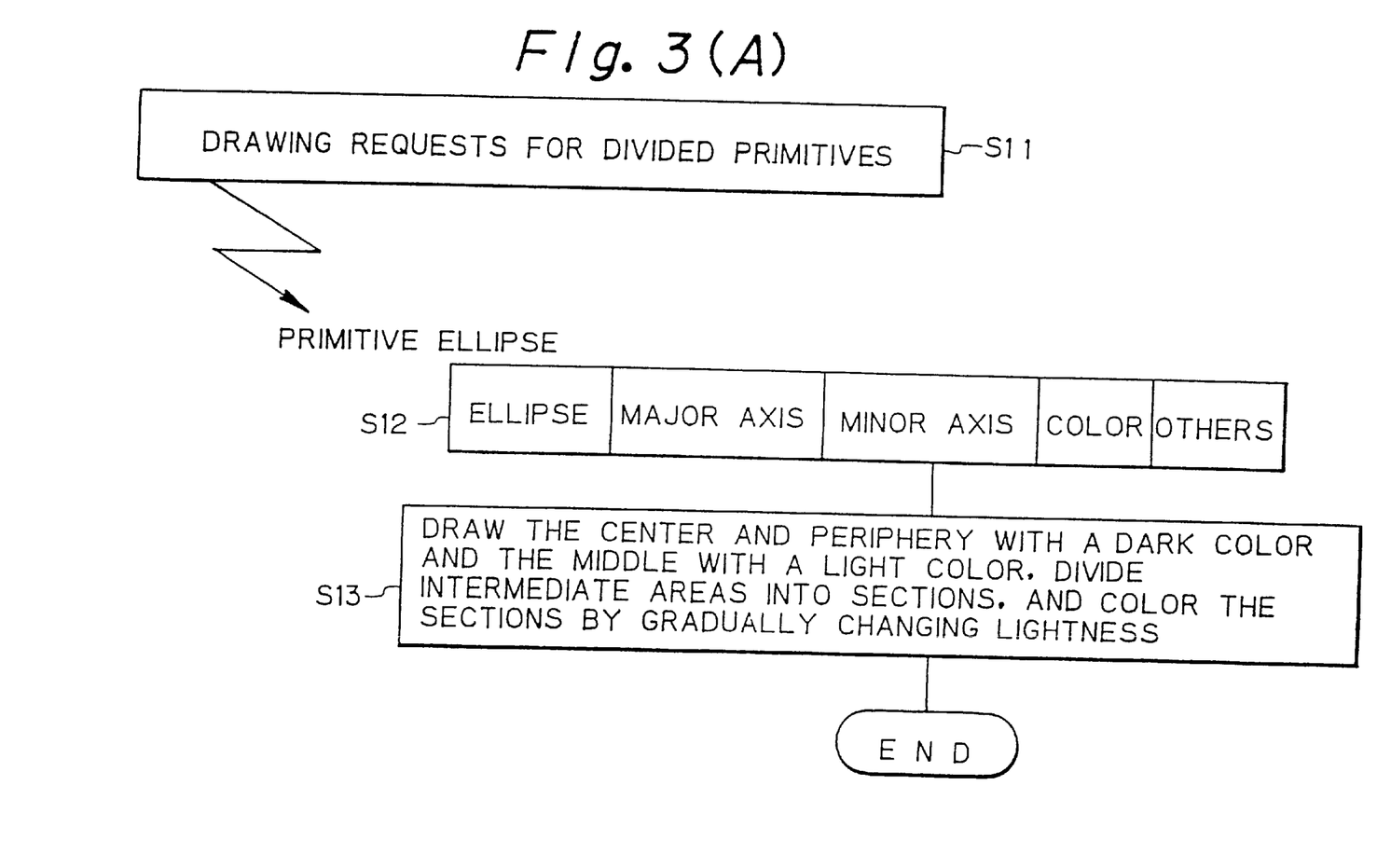
FIG. 3A is a flowchart showing a grading process in drawing an elliptic shape by the apparatus according to the invention.
Figure 3B:
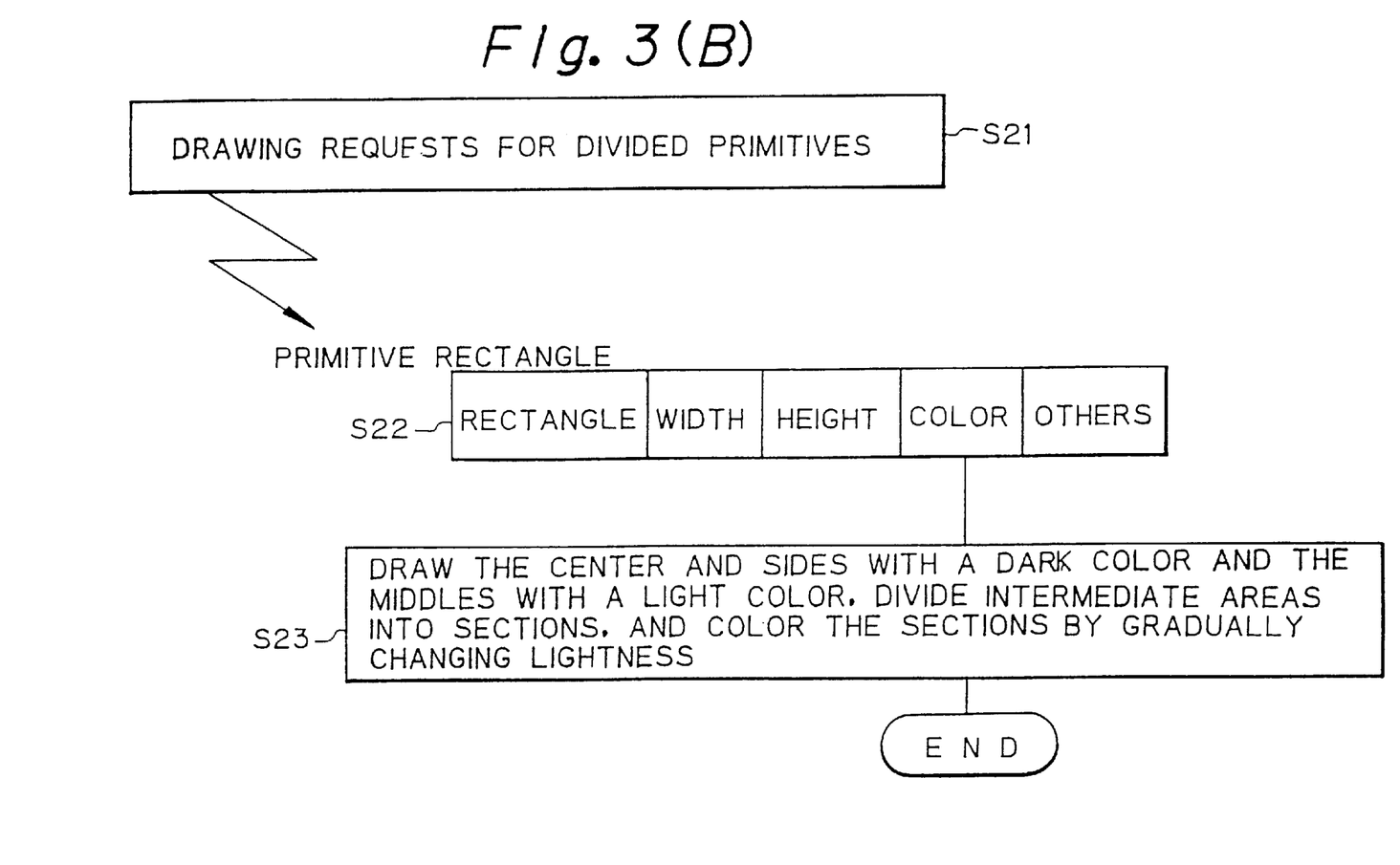
FIG. 3B is a flowchart showing a grading process of drawing a rectangular shape by the apparatus according to the present invention

FIGS. 3A and 3B show flowcharts of grading processes according to the invention.

FIG. 3(A) illustrates a process of drawing an elliptic shape according to a primitive ELLIPSE at a high speed.

In the figure, Step S11 issues requests to draw divided primitives. This step corresponds to Steps S5 and S7 of FIG. 2 for issuing primitive drawing requests.

Step S12 receives the primitive ELLIPSE indicating an ellipse, a major axis, a minor axis, colors, and others related to the elliptic shape.

Step S13 paints the center and periphery of the ellipse with a dark color and the middle between the center and the periphery with a light color, divides each of the intermediate areas between the middle and the center and the periphery into a predetermined number of sections, and colors the sections by gradually changing the lightness of the colors.

Namely, according to the primitive ELLIPSE, Step S13 draws the periphery and the center of the ellipse with a dark color and the middle between the center and the periphery with a light color, divides each of the intermediate areas between the middle and the center and the periphery into a predetermined number of sections, and colors the sections by gradually increasing the lightness of the color from the periphery toward the lightest middle and then gradually decreasing the lightness of the color from the lightest middle toward the center.

In this way, this example gradually changes the lightness of the colors from the periphery toward the center in order of dark (periphery), light (middle), and dark (center) to thereby provide a stereoscopic elliptic part for a three-dimensional object.

FIG. 3(B) shows a process of drawing a rectangular shape according to a primitive RECTANGLE at a high speed.

In the figure, Step S21 issues requests to draw divided primitives. This step corresponds to Step S5 of FIG. 2 for issuing primitive drawing requests.

Step S22 receives the primitive RECTANGLE indicating a rectangle, a width, a height, colors, and others related to the rectangular shape.

Step S23 paints both sides and a center part of the rectangle with a dark color and paints the middle parts between the center part and the sides with a light color, divides each of intermediate areas between the middle parts and the sides and the center part into a predetermined number of sections, and colors the sections by gradually changing the lightness of the colors.

Namely, according to the primitive RECTANGLE, Step S23 draws both the sides and the center part of the rectangle with the dark color and the middle parts between the center part and the sides with a light color, divides each of the intermediate areas between the middle parts and the sides and the center part into a predetermined number of sections, and colors the sections by gradually increasing the lightness of the color from each side toward the lightest middle parts, and then gradually decreasing the lightness of the color from the lightest middle parts toward the center part.

In this way, this example gradually changes the lightness of the colors from each side towards the center part in order of dark (side), light (middle), and dark (center), to thereby provide a stereoscopic three-dimensional image.

Figure 4A:
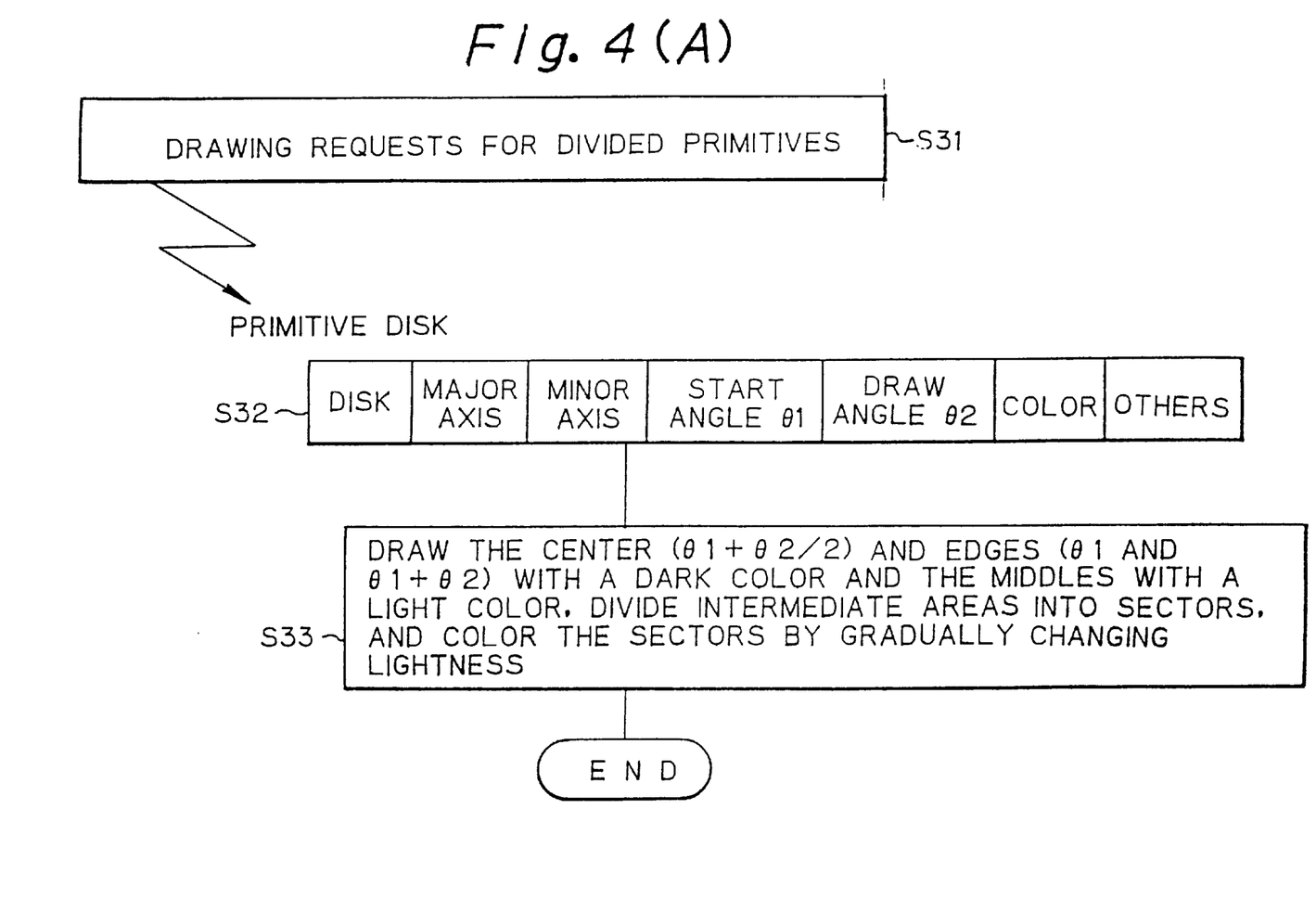
FIG. 4A is a flowchart showing a grading process in drawing a disk shape by the apparatus according to the invention.

FIG. 4(A) is a process of drawing a disk shape according to a primitive DISK at a high speed.

In the figure, Step S31 issues requests to draw divided primitives. This step corresponds to Step S8 of FIG. 2 for issuing primitive drawing requests.

Step 32 receives the primitive DISK indicating a disk, a major axis, a minor axis, a start angle θ1, a draw angle θ2, colors, and others related to the disk shape.

According to the start angle θ1 and draw angle θ2, Step S33 paints a center part (θ1+θ2/2) and edges (θ1 and θ1+θ2) of the disk with a dark color while the middle parts between them with a light color, divides each of intermediate areas between the middle parts and the center part and the edges into a predetermined number of sectors, and colors the sectors by gradually changing the lightness of the colors.

Namely, according to the primitive DISK, Step S33 draws the center part (a part defined by the start angle θ1 plus a half of the draw angle θ2 in FIG. 7) and the edges (θ1 and θ1+θ2) of the disk with a dark color and the middle parts between them with a light color, divides each of the intermediate areas between the middle parts and the center part and the edges into a predetermined number of sectors, and colors the sectors by gradually changing the lightness of the colors in order of dark, light, dark, light, and dark to thereby provide a stereoscopic three-dimensional smooth disk image.

FIG. 7 shows a disk being drawn by the apparatus according to the invention. The disk C1 is used as it is as a shape that can be drawn at a high speed. This disk C1 is drawn according to the flowchart of FIG. 4(A).

At first, the invention draws a center part (a part defined by a start angle θ1 plus a half of a draw angle θ2) and edges (θ1 and θ1+θ2) of the disk C1 with a dark color, divides each of intermediate areas between the center part and the edges into a predetermined number of sectors (for example, 16 sectors), and colors the sectors by gradually changing the lightness of the color from the sector with a draw angle of 0 toward the sector with a draw angle of θ2 in order of, for example, dark (draw angle of 0), light, dark (center), light, and dark (draw angle of θ2).

Figure 4B:
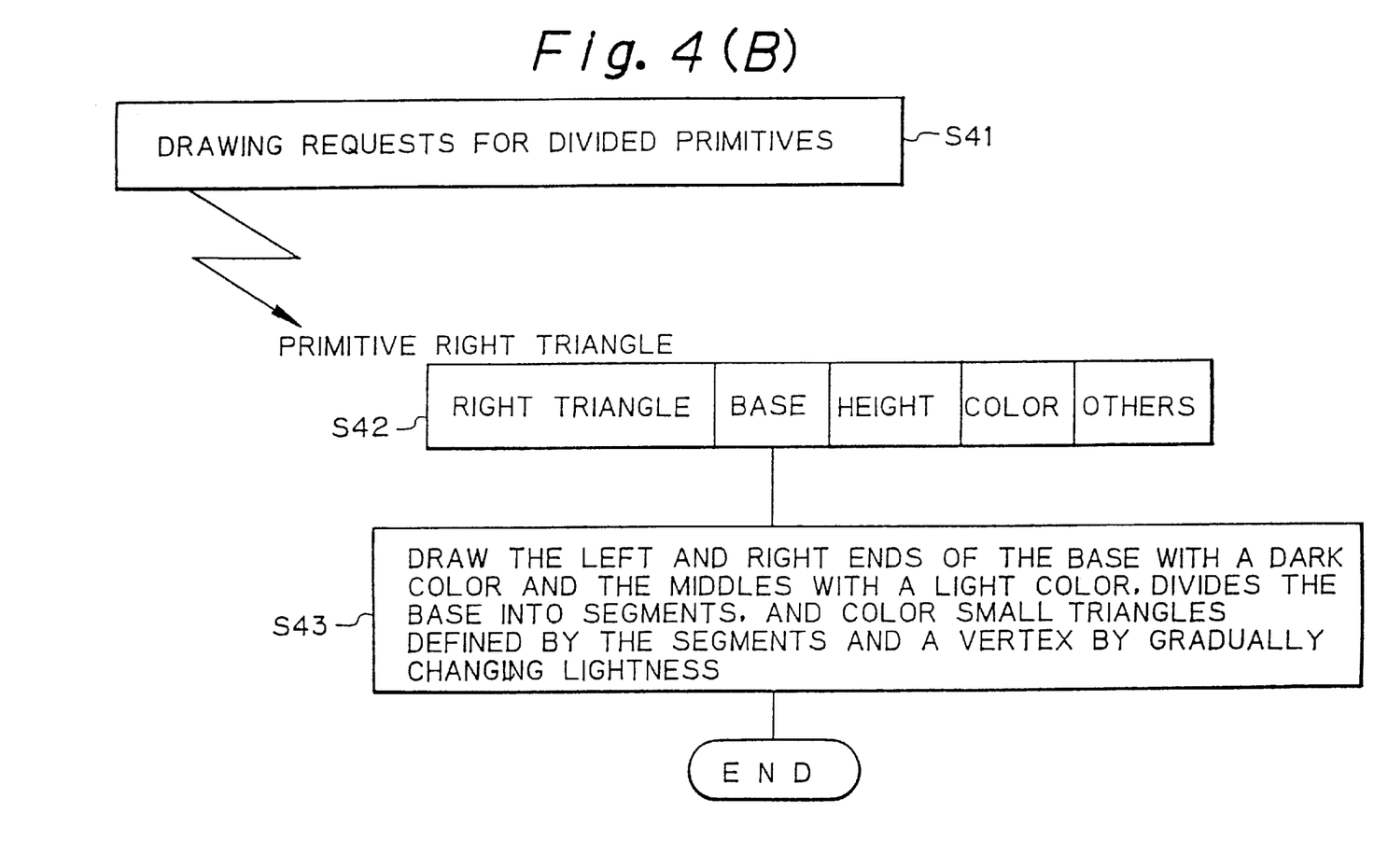
FIG. 4B is a flowchart showing a grading process in drawing a right triangle shape by the apparatus according to the invention.

FIG. 4(B) illustrates a process of drawing a right triangle shape according to a primitive RIGHT TRIANGLE at a high speed.

In the figure, Step S41 issues requests to draw divided primitives.

Step S42 receives the primitive RIGHT TRIANGLE indicating a right triangle, a base, a height, colors, and others related to the right triangle shape.

Step S43 paints left and right ends of the base with a dark color while the middle of both ends with a light color, divides each of intermediate sections between the middle and the left and the right ends into a predetermined number of segments, and colors small triangles defined by the divided base segments and a vertex by gradually changing the lightness of the colors.

Namely, Step S43 divides the right triangle, specified by the primitive RIGHT TRIANGLE, into a predetermined number of small triangles, and colors the small triangles by gradually changing the lightness of the colors in order of dark, light, and dark to thereby provide a stereoscopic three-dimensional smooth right triangle image.

FIG. 6 shows a cone being drawn by the apparatus according to the invention.

As mentioned above, the invention provides an automatic drawing apparatus for efficiently drawing a required three-dimensional object at a high speed. The number of primitives formed by dividing the object is not particularly limited but may be optionally determined according to the shape of the object.

According to the invention, the number of colors is not particularly limited. The invention may optionally use a single color, or a combination of three, five, or more colors.

The invention selects the lightest and the darkest parts for each of the colors used. The numbers of these lightest and darkest parts are not limited to one each; they may be two each or more. The invention may adopt various combinations of numbers.

The invention divides an intermediate area between a lightest part and a darkest part on a divided shape into sections, and paints the sections with predetermined colors. The invention may arrange these sections at regular intervals and widths, or at different intervals and widths.

The invention does not limit the number of divided sections. The invention may properly select the number according to requirements.

In the above explanations, the invention colors divided sections by successively decreasing the lightness of colors at a predetermined rate from the lightest part to the darkest part. The invention is not limited by this method. The invention may color the sections with different degrees of lightness at random, or according to a given rule.

Figure 10:
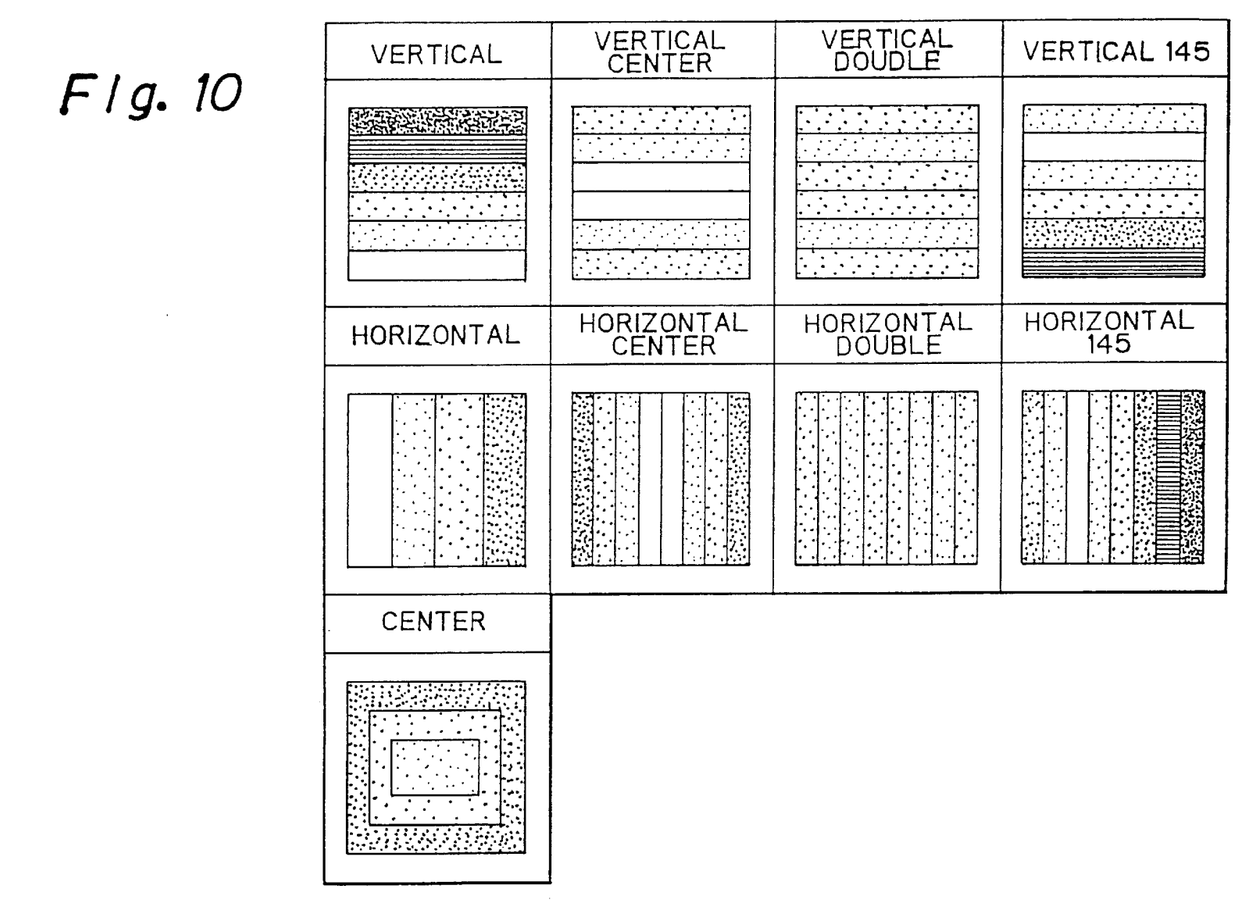
FIG. 10 is a view showing various coloring examples of a divided primitive produced by the apparatus according to the invention.

FIG. 10 shows examples of coloring divided sections.

As explained above, the invention divides a three-dimensional object into simple shapes such as circles, ellipses, rectangles, and triangles, prepares primitives for these shapes, and draws the shapes according to the primitives by gradually changing lightness and chromaticity to thereby provide a three-dimensional image of the object having a material-like impression at a high speed. Namely, the invention draws a three-dimensional image by repeatedly drawing two-dimensional figures without particularly paying attention to three-dimensionality. The invention can easily and quickly display a three-dimensional image having, for example, a metallic touch and smooth curves.

We claim:

1. A computerized automatic image drawing apparatus for grading a two dimensional image of an object, comprising:

primitive forming means for dividing a two dimensional image having a peripheral outline, represented by two-dimensional image data, into a plurality of discrete two-dimensional primitives of predetermined shapes possessing a finite spread or area;

grading means for dividing each of said selected plurality of two-dimensional primitives into a predetermined number of adjacent two dimensional sections, and grading at least one of the respective sections of each of said plurality of two-dimensional primitives by changing at least one of color, lightness and chromaticity thereof, according to predetermined conditions to obtain graded primitives; and displaying means for combining the graded primitives together to recreate said peripheral outline, and for displaying the combined primitives as a graded two-dimensional image or said object;

the grading means selects a lightest first part and a darkest second part on one of the selected primitives, divides an intermediate area between the first and second parts into a plurality of sections, and sequentially colors the sections in order of lightness.

2. An automatic image drawing apparatus according to claim 1, where the grading means is formed to grade the sections with at least one color.

3. An automatic image drawing apparatus according to claim 2, wherein, when using two or more colors, the grading means selects the lightest first part and the darkest second part for each of the colors, divides the intermediate area between the first and second parts for each color into a plurality of sections, and sequentially grades the sections in order of lightness for each color.

4. An automatic image drawing apparatus according to claim 1, wherein at least some of said primitives differ in shape from each other.

5. An automatic image drawing apparatus according to claim 4, wherein the grading means colors the sections by using different lightness and chromaticity within at least one color.

6. An automatic image drawing apparatus according to claim 5, wherein when using two or more colors, the means to select selects the lightest first part and the darkest second part for each of the colors, divides the intermediate area between the first and second parts for each color into a plurality of sections, and sequentially colors the sections for each color in order of lightness from the section corresponding to the first part toward the section corresponding to the second part.

7. An automatic image drawing apparatus for grading a two-dimensional image of an object, comprising:

primitive forming means for dividing a two dimensional image having a peripheral outline, represented by two-dimensional image data, into a plurality of discrete two-dimensional primitives of predetermined shapes possessing a finite spread or area;

grading means for dividing each of said selected plurality of two-dimensional primitives into a predetermined number of adjacent two dimensional sections, and grading the sections of each of said plurality of two-dimensional primitives by changing at least one of color, lightness and chromaticity thereof, adjacent sections being graded relative to each other in accordance with a predetermined and selected pattern to obtain graded primitives; and displaying means for combining the graded primitives together to recreate said peripheral outline, and for displaying the combined primitives as a graded two-dimensional image of said object;

the grading means selects a lightest first part and a darkest second part on one of the selected primitives, divides an intermediate area between the first and second parts into a plurality of sections, and sequentially colors the sections in order of lightness.

8. An automatic image drawing apparatus of claim 7, wherein said prestored shapes are selected from a group consisting of a rectangle, a triangle, a circle, an ellipse, a disk and a polygon.

9. An automatic image drawing apparatus of claim 8, wherein said primitive forming means divides a cylinder into said ellipse and said rectangle.

10. An automatic image drawing apparatus of claim 8, wherein said primitive forming means divides a cone into two said triangles.

11. A computerized automatic image drawing apparatus for displaying a two-dimensional image of an object with a three-dimensional effect, comprising:

primitive forming means for dividing a two-dimensional image having a peripheral outline, represented by two-dimensional image data, into a plurality of discrete two-dimensional primitives of predetermined shapes;

grading means for grading one of the primitives by changing at least one of color, lightness and chromaticity thereof, according to predetermined conditions defined for respective primitives, to thus obtain graded primitives; and displaying means for combining the graded primitives together to recreate said peripheral outline, and for displaying the combined primitives as a graded two-dimensional image of said object;

the grading means selects a lightest first part and a darkest second part on one of the selected primitives, divides an intermediate area between the first and second parts into a plurality of sections, and sequentially colors the sections in order of lightness.

12. A computerized automatic image drawing apparatus of claim 11, wherein said prestored shapes are selected from a group consisting of a rectangle, triangle, a circle, a ellipse, a disk and a polygon.

13. A computerized automatic image drawing apparatus of claim 11, wherein said primitive forming means divides a cylinder into said ellipse and said rectangle.

14. A computerized automatic image drawing apparatus of claim 11, wherein said primitive forming means divides a cone into two said triangles.

* * * * *